United States Patent [19]

Alexandrov et al.

[11] Patent Number: 4,841,537

[45] Date of Patent: Jun. 20, 1989

[54] MEDIUM FOR GAS LASER EXCITED BY IONIZING PARTICLES

[76] Inventors: Andrei J. Alexandrov, ulitsa Volgina, 9, korpus 1, kv. 122; Viktor A. Dolgikh, ulitsa Dolgoprudnaya, 3, kv. 18; Oleg M. Kerimov, 2 Pugachevskaya ulitsa, 3,korpus 1, kv. 231; Alexei J. Samarin, ulitsa Ostrovityanova, 35a, kv. 147, all of Moscow; Igor G. Rudoi, ulitsa Sportivnaya, 7, kv.44, Moskovskaya oblast, Shatura; Arkady M. Soroka, ulitsa Novatorov, 4, korpus 6, kv. 53, Moscow, all of U.S.S.R.

[21] Appl. No.: 271,953

[22] PCT Filed: Jan. 15, 1988

[86] PCT No.: PCT/SU88/00013

§ 371 Date: Sep. 27, 1988

§ 102(e) Date: Sep. 27, 1988

[87] PCT Pub. No.: WO88/05971

PCT Pub. Date: Aug. 11, 1988

[30] Foreign Application Priority Data

Jan. 28, 1987 [SU] U.S.S.R. ............... 4186717

[51] Int. Cl.$^4$ .................... H01S 3/22; H01S 3/223
[52] U.S. Cl. .................... 372/55; 372/56; 372/60; 372/76; 372/90
[58] Field of Search .................... 372/55, 56, 60, 61, 372/68, 76, 85, 90

[56] References Cited

U.S. PATENT DOCUMENTS 4,369,514 1/1983 Silfvast et al. .................... 372/55
4,672,625 6/1987 Sheng .................... 372/60

FOREIGN PATENT DOCUMENTS 2654254 6/1978 Fed. Rep. of Germany ........ 372/55
0063874 4/1982 Japan .................... 372/55
1344179 1/1985 U.S.S.R. .

OTHER PUBLICATIONS

"Visible & uv Laser Oscillation at 118 Wavelengths in Ionized Neon, Argon, Krypton, Xenon, Oxygen & Other Gases", by W. B. Bridges et al., Applied Optics, vol. 4, No. 5, May 1965, pp. 573–580.

"A High Pressure 585.3 nm Neon Laser", by D. Schmieder et al., Optics Communications, vol. 36, No. 3, Feb. 1981, pp. 223–226.

"Moschny Ne-H$_2$ Laser s Nakachkoi ot Malogabaritnogo Promyshlennogo Uskoritelya", by F. V. Bunkin et al., Kvantovaya Elektronika, vol. 12, No. 10, 1985, (Sovetskoe Radio Publ., Moscow), pp. 1993–1994.

"Issledovanie Generatsii v Neone pri Nakachke Samostoyatelnym Razryadom s UF Pred oniazatsiei", by M. I. Lomaev et al., Kvantovaya Elektronika, vol. 14, No. 5, 1987, (Sovetskoe Radio Publ., Moscow), pp. 993–995.

"O Vliyanii na Energeticheskie Kharakteristiki Lazerov Vysokogo Davlenia s Nakachkoi Elektronnym Puchkom na Smesyakh He-Ar, Kr, Xe", by N. G. Basov et al., Kvantovaya Elektronika, vol. 13, No. 3, 1986, (Sovetskoe Radio Publ., Moscow), pp. 488–492.

*Primary Examiner*—William L. Sikes
*Assistant Examiner*—Georgia Y. Epps
*Attorney, Agent, or Firm*—Fleit, Jacobson, Cohn, Price, Holman & Stern

[57] ABSTRACT

A medium for a gas laser excited by ionizing particles containing helium, neon, argon or krypton with a total concentration in excess of $10^{19}$ cm$^{-3}$ with argon or krypton concentration ranging from $3 \cdot 10^{16}$ cm$^{-3}$ to a value amounting to 15% of the total concentration. The medium additionally comprises at least one more component selected from the group comprising, xenon, hydrogen, hydrogen isotope, or a mixture of these components in various combinations, the concentration of each component or the mixture thereof being selected from a range from $10^{15}$ cm$^{-3}$ to a value equal to 20% of the concentration of argon or krypton.

1 Claim, 2 Drawing Sheets

MEDIUM FOR GAS LASER EXCITED BY IONIZING PARTICLES

FIELD OF THE INVENTION

The invention relates to quantum electronics and, more specifically, it deals with a gas laser medium excited by ionizing particles.

PRIOR ART

Known in the art is a laser medium for generation at the 3p–3s neon transition consisting of helium and neon at a total concentration of up to $7 \cdot 10^{15}$ cm$^{-3}$ and argon traces, which are excited with a fast electric discharge (Applied Optics, Vol. 4, No. 5, 1965, May, New York, W. B. Bridges, A. N. Chester. "Visible & NV Laser Oscillation at 118 Wavelengths in Ionized Neon, Argon, Krypton, Xenon, Oxygen & Other Gases", pp. 573–580; pp. 573, 577). Generation with atomic neon in the visible spectral area ($\lambda = 5852.5$ Å) was first obtained in this medium at the transition $3p'[\frac{1}{2}]_o - 3s'[\frac{1}{2}]_1$. However, laser efficiency was very low and the capillary nature of discharge restricted divergence of radiation at a low level, the generation being self-limiting with a maximum duration of 10 ns so that the field of application of the laser was rather limited and requirements imposed upon an injection source were very stringent.

Also known in the art is a laser medium for generation at the $3p'[\frac{1}{2}]_o - 3s'[\frac{1}{2}]_1$ transition of neon ($\lambda = 5852.5$ Å) consisting of neon and hydrogen with a total concentration of about $2 \cdot 10^{19}$ cm$^{-3}$ with a hydrogen concentration $\geq 30\%$, which is excited by an electrical discharge (Optics Communications, Vol. 36, No. 3, 1981, February, Amsterdam, D. Schmieder, D. J. Brink, T. I. Salamon, E. G. Jones. "A High Pressure 585.3 nm Neon Laser", pp. 223–226). The quasicontinuous generation mode at $\lambda = 5852.5$ Å with a duration up to 140 ns was first realized here, but laser efficiency remained low—at a level of several thousandths of a percent (maximum obtainable energy of 9 μJ), the laser volume being limited as well.

Low efficiency of these lasers is caused by a non-optimum composition of the laser medium and inefficient population of the upper laser level when excited with an electrical discharge.

Also known in the art is a gas laser medium excited by ionizing particles, consisting of helium, neon and argon or krypton with a total concentration of more than $10^{19}$ cm$^{-3}$ with a concentration of argon or krypton between $3 \cdot 10^{16}$ cm$^{-3}$ and a value which amounts to 15% of the total concentration (SU, A, 1344179). Here, with a moderate specific injection power which may be realized using existing sources of ionizing radiation in the pulse-intermittent mode, an efficiency of 1 to 1.3% was achieved at $\lambda = 5852.5$ Å and of 0.3% at $\lambda = 7245$ Å. Excitation with ionizing particles makes it possible to achieve generation within a large active volume and to obtain substantially the diffraction divergence at an aperture of 10 cm and more. Efficiency is determined by efficiency of population of the top laser level and might have been 2 to 2.5% at $\lambda = 5852.5$ Å and 1 to 1.5% at $\lambda = 7245$ Å. A reduction of efficiency in comparison with the ultimate efficiency is caused by a substantial non-resonance absorption in the laser medium which also results in a lower specific radiated power.

DISCLOSURE OF THE INVENTION

It is an object of the invention to provide a gas laser source excited by ionizing particles which ensures an improvement of efficiency and an increase in specific laser radiation power at the 3p–3s neon transitions.

This object is accomplished by that there is provided a gas laser medium excited by ionizing particles, containing helium, neon, argon or krypton with a total concentration of more than $10^{19}$ cm$^{-3}$ and a concentration of argon or krypton, ranging from $3 \cdot 10^{16}$ cm$^{-3}$ and a value which amounts to 15% of the total concentration which, according to the invention, contains at least one more component selected from the group consisting of xenon, hydrogen, hydrogen isotopes, or a mixture of these components in various combinations, the concentration of each of the components or of a mixture thereof being chosen between $10^{15}$ cm$^{-3}$ and a value which amounts to 20% of concentration of argon or krypton.

BRIEF DESCRIPTION OF DRAWINGS

The invention will now be described with a detailed disclosure of a laser medium with reference to the accompanying drawings, in which.

BEST MODE FOR CARRYING OUT THE INVENTION

Figure 1:
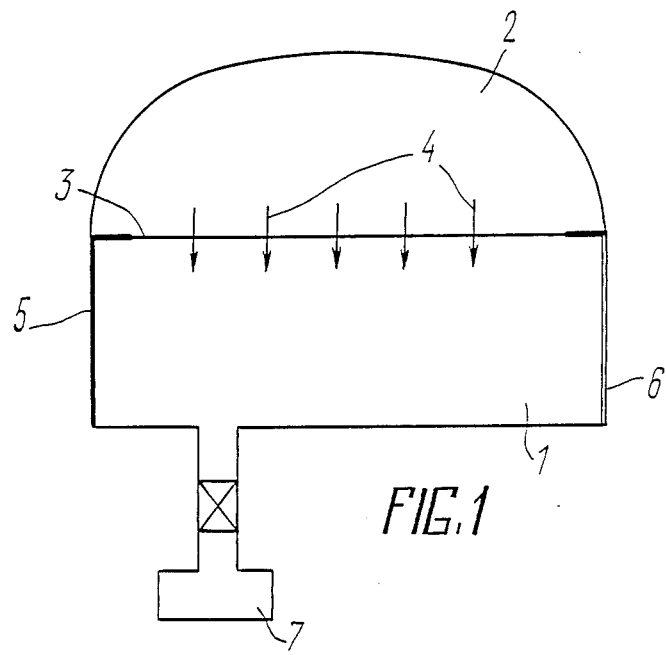
FIG. 1 schematically shows a gas laser featuring ionizing radiation in a front elevation view.

A gas laser (FIG. 1) comprises a working chamber 1 for a laser medium and an electron gun 2 communicating with each other through a thin vacuum-proof foil 3 for the passage of a beam 4 of fast electrons. Mirrors 5, 6 forming a laser resonator are secured to the ends of the chamber 1, and the chamber communicates with a system 7 for laser medium admission and removal.

Figure 2:
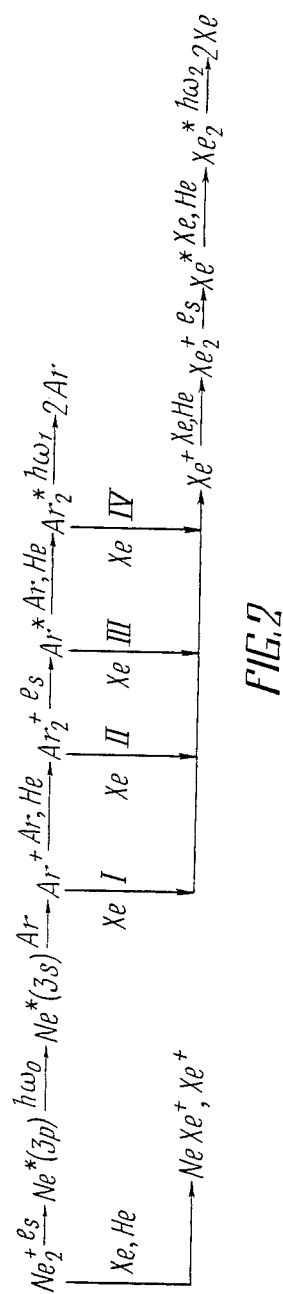
FIG. 2 is a kinetic diagram of the process of deactivation of the lower laser level.

The laser medium may be excited by ionizing particles of various nature such as electrons, protons, X-rays, neutrons, α-particles using appropriate known sources. The beam of fast electrons 4 accelerated in the electron gun 2 passes through the foil 3 to the working chamber 1 which is filled with a laser medium, according to the invention, by means of the system 7, the laser medium containing He, Ne, Ar or Kr and at least one more component selected from the group consisting of xenon, hydrogen, hydrogen isotopes with a total concentration of more than $10^{19}$ cm$^{-3}$. Concentration of Ar or Kr is between $3 \cdot 10^{16}$ cm$^{-3}$ and a value which amounts to 15% of the total concentration of the laser medium, and concentration of Xe, H$_2$, its isotopes or of a mixture thereof is between $10^{15}$ cm$^{-3}$ and a value which amounts to 20% of concentration of Ar or Kr. When decelerated in the laser medium, fast electrons form atomic ions, mainly He$^+$, Ne$^+$, as concentration of these gases is substantially higher than concentration of other components of the laser medium. In a number of ion-molecular reactions, these ions are converted into molecular ions Ne$_2^+$, and as a result of a dissociative recombination thereof, the top laser level 3p is populated as shown in FIG. 2. Here, the $e_s$ are "slow" secondary electrons formed as a result of deceleration of fast electrons; $\hbar\omega_o$ is the laser quantum ($\lambda = 5852.5$ Å); $\hbar\omega_1$, $\hbar\omega_2$ is the spontaneous radiation of dimers Ar$_2^*$ and Xe$_2^*$, the particles participating in the collision being shown above the arrows. The lower laser level 3s is deactivated in collisions with argon which results in the appearance of $Ar^+$ ion. As a result, a stationary inversion of the populations and amplification are established at the 3p–3s neon transitions, and the mirrors 5, 6 ensure a feedback necessary for the laser generation. Further, in the absence of xenon, $Ar_2^*$ dimer is formed in the chain of the kinetic processes shown, and this dimer is splitted into two argon atoms by emissivity.

We have found that the non-resonance absorption in the laser medium is caused exactly by the dimers $Ar_2^*$ ($Kr_2^*$). The presence of the non-resonance absorption determines maximum efficiency of the emission output $\eta$ in accordance with the well-known formula $\eta = (1 - \sqrt{\beta/\alpha_o})^2$, wherein $\alpha_o$, $\beta$ are the coefficients of non-saturated amplification and non-resonance absorption. For an optimum composition of the laser medium containing He, Ne, Ar at $\lambda = 5852.5$ Å, $\alpha_o \simeq 9\beta$, so that $\eta \simeq 0.45$. We have found that adding Xe, $H_2$ or its isotopes in a low concentration allows $\beta$ to be decreased four times and even more, i.e. with an increase in $\eta$ up to 0.7 and more, without any substantial change in $\alpha_o$, which is equivalent to 1.5-fold and even greater improvement of efficiency. An improvement of efficiency at a constant specific injection power will naturally result in an increase in specific generation power. A reduction of $\beta$ is associated with a material lowering of concentration of dimers $Ar_2^*$ owing to the occurrence of fast processes I–IV (FIG. 2) competing with the processes resulting in the appearance of $Ar_2^*$.

We have found that dimers $Xe_2^*$ which are thus formed will be substantially less active in absorbing laser emission, in particular because the rate of spontaneous decomposition is about one order higher (concentration of $Xe_2^*$ is about ten times as low as that of $Ar_2^*$ in the absence of xenon with a constant specific injection power).

In case hydrogen or its isotopes are used, a decrease in concentration of dimers $Ar_2^*$ occurs for the same reasons, the evolution of $H_2$ ions taking place in accordance with the following pattern:

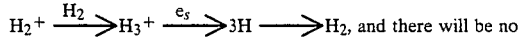

and there will be no absorption of laser emission at all at any stage.

Minimum concentration of Xe, $H_2$ or its isotopes is determined by the condition according to which owing to the occurrence of processes I–IV (FIG. 2), the stationary concentration of $Ar_2^*$ decreases by at least 1.2 times (typically it corresponds to a 10% increase in $\eta$). Maximum concentration is determined by competition of the dissociative recombination of $Ne_2^+$ with its recharging in triple collisions (a dash line in FIG. 2) and was found by experiments.

A low concentration of xenon, hydrogen or its isotopes is used for the first time in the laser medium according to the invention at a high pressure (a concentration above $10^{19}$ $cm^{-3}$), this concentration having practically no effect on the efficiency of population of the top laser level and the rate of deactivation of the lower level, but as we have found, it ensures a substantial decrease in the amount of non-resonance absorption which results in an impovement of laser efficiency and an increase in specific generation power. At the same time, all advantages of the laser medium of the prior art (SU, A, 1344179) are retained, including the absence of its degradation.

Exemplary embodiments of the invention are given below in the form of specific examples.

EXAMPLE 1

The electron gun 2 (FIG. 1) generated a beam of fast electrons $4 \times 34$ $cm^2$ in the cross-section, with a current density of 1 $A/cm^2$, with a duration of 1 $\mu s$. Titanium foil 3 was 50 $\mu m$ thick, and the energy of the beam electrons downstream the foil was 150 keV. Planar dielectric mirrors 5, 6 were mounted in the working chamber 1. The mirror 5 has the reflectivity of 99.9% at the generation wavelength, and the reflectivity of the mirror 6 was varied to obtain maximum laser energy. The surface area of the mirrors 5, 6 was $2 \times 3$ $cm^2$ so that the optical volume of the laser was $2 \times 3 \times 34 = 200$ $cm^3$.

With the injection of the laser medium containing $5.4 \cdot 10^{19}$ $cm^{-3}$ (2 atm.) He, $4.2 \cdot 10^{18}$ $cm^{-3}$ (120 Torr) Ne, $2.1 \cdot 10^{18}$ $cm^{-3}$ (60 Torr) Ar (argon concentration about 3%) in the chamber, with the transparence of the mirror 6 R=26%, which was close to optimum, generation energy at $\lambda = 5852.5$ Å was $E_o = 4.2$ mJ (power 4.2 kW; 21 $W/cm^3$) which corresponded to an efficiency of about 0.4%.

Adding to this laser medium $3.5 \cdot 10^{16}$ $cm^{-3}$ (1 Torr) Xe (1.6% of Ar concentration) and using the mirror 6 with R=14% (a decrease in the optimum transparence was caused by a decrease in $\beta$) made it possible to obtain the energy $E_1 = 8.5$ mJ (power 8.5 kW; 42 $W/cm^3$) and an efficiency of about 0.8%. A decrease in Xe concentration to $3.5 \cdot 10^{15}$ $cm^{-3}$ (0.1 Torr) resulted in a decrease in the laser energy practically down to $E_o$, and an increase in Xe concentration up to $3.5 \cdot 10^{17}$ $cm^{-3}$ (10 Torr) (16% of Ar concentration) resulted in a decrease in the generation energy to 3.5 mJ.

The use of hydrogen or deuterium to replace hydrogen gave similar results.

EXAMPLE 2

The experimental plant was the same as that used in Example 1. When a laser medium was injected into the working chamber 1, which contained $2.7 \cdot 10^{19}$ $cm^{-3}$ (1 atm.) He, $4 \cdot 10^{19}$ $cm^{-3}$ (1.5 atm.) Ne, $6.7 \cdot 10^{18}$ $cm^{-3}$ (190 Torr) Kr (krypton concentration of about 9%) with R=20% of the mirror 6, a generation energy at $\lambda = 7245$ Å was about 5 mJ (power 5 kW; 25 $W/cm^3$) which corresponded to an efficiency of about 0.2%. Adding $7 \cdot 10^{16}$ $cm^{-3}$ (2 Torr) Xe (1% of krypton concentration) to this medium and lowering R of the mirror 6 to 11% made it possible to achieve the laser energy of 12 mJ (12 kW; 60 $W/cm^3$) which corresponded to an efficiency of about 0.5%. With an optimum concentration of hydrogen $3.5 \cdot 10^{16}$ $cm^{-3}$ (1 Torr), the generation energy was 11 mJ at $\lambda = 7245$ Å.

EXAMPLE 3

In the experimental plant of Example 1, the electron gun generated an electron beam with a current density of 40 $mA/cm^2$ and a duration of 30 $\mu s$.

When a laser medium was injected into the working chamber 1, which contained $5.4 \cdot 10^{19}$ $cm^{-3}$ (2 atm.) He, $2 \cdot 10^{18}$ $cm^{-3}$ (60 Torr) Ne, $7 \cdot 10^{17}$ $cm^{-3}$ (20 Torr) Ar (argon concentration of about 1%) and with R=14% of the mirror 6, the laser generation energy was 16 mJ (power 500 W; 2.5 $W/cm^3$) which corresponded to an efficiency of about 1.1%.

Adding to the laser medium $1.3 \cdot 10^{16}$ $cm^{-3}$ (0.4 Torr) Xe with R=8% of the mirror 6 (2% of Ar concentration), the laser energy was increased up to 23 mJ (power about 800 W, 4 W/cm$^3$), and the efficiency of 1.6% was achieved. Adding to the laser medium $10^{16}$ cm$^{-3}$ (0.3 Torr) H$_2$ allowed the laser energy of 26 mJ to be produced (power about 900 W, 4.5 W/cm$^3$) and the efficiency was 1.8%. The use of 7·10$^{15}$ cm$^{-3}$ (0.2 Torr) Xe and 7·10$^{15}$ cm$^{-3}$ (0.2 Torr) H$_2$ gave the laser energy of 25 mJ. A decrease in xenon concentration (in the absence of hydrogen) to 1.3·10$^{15}$ cm$^{-3}$ (0.03 Torr) resulted in a decrease in generation energy to 17 mJ, i.e. substantially to the initial level, and an increase in xenon concentration to 1.8·10$^{17}$ cm$^{-3}$ (5 Torr) (25% of argon concentration) resulted in a decrease in the laser energy to 13 mJ.

EXAMPLE 4

The experimental plant was similar to that of Examples 1 through 3. When a laser medium injected into the working chamber 1 contained 2.7·10$^{19}$ cm$^{-3}$ (1 atm.) He, 2.7·10$^{19}$ cm$^{-3}$ (1 atm.) Ne, 2·10$^{18}$ cm$^{-3}$ (60 Torr) Ar (argon concentration 4%), laser energy at $\lambda = 7245$ Å was about 10 mJ (power about 330 W, 1.6 W/cm$^3$) which corresponded to the efficiency of 0.35%. Adding 3.5·10$^{16}$ cm$^{-3}$ (1 Torr) Xe to the laser medium allowed the laser energy to be increased to 22 mJ (power 700 W, 3.5 W/cm$^3$), with the efficiency of up to 0.7%. Adding 3·10$^{16}$ cm$^{-3}$ (1 Torr) H$_2$ to the laser medium resulted in an increase in the energy to 24 mJ (800 W, 4 W/cm$^3$), i.e. efficiency and specific radiation power were two times as great. The use of deuterium in the same concentration to replace hydrogen produced laser energy of 20 mJ.

The laser medium, according to the invention, allows efficiency to be increased by 1.5–2 times with a respective increase in specific laser radiation power at the 3p–3s neon transitions while retaining all advantages of the laser medium disclosed in SU, A, 1344179.

Industrial Applicability

A gas laser with a laser medium according to the invention can be used in mechanical engineering, optical communication equipment, in non-destructive testing, and holography.

We claim:

1. A medium for a gas laser excited by ionizing particles, containing helium, neon, argon or krypton with a total concentration of more than 10$^{19}$ cm$^{-3}$, with argon or krypton concentration ranging from 3·10$^{16}$ cm$^{-3}$ to a value which amounts to 15% of the total concentration, and at least one more component selected from the group consisting of xenon, hydrogen, hydrogen isotope, or a mixture of these components in various combinations, the concentration of each of the components or of a mixture thereof being chosen from a range from 10$^{15}$ cm$^{-3}$ to a value which amounts to 20% of argon or krypton concentration.

* * * * *